(12) United States Patent
Caruel (10) Patent No.: US 12,365,472 B2
(45) Date of Patent: Jul. 22, 2025

(54) COMPRISING AN ACCESS SPACE CLOSED BY A TANGENTIALLY CLAMPED COWL

(71) Applicant: SAFRAN NACELLES, Gonfreville-l'Orcher (FR)

(72) Inventor: Pierre Charles Caruel, Moissy-Cramayel (FR)

(73) Assignee: SAFRAN NACELLES, Gonfreville-L'Orcher (FR)

( * ) Notice: Subject to any disclaimer, the term of this patent is extended or adjusted under 35 U.S.C. 154(b) by 0 days.

(21) Appl. No.: 18/689,195

(22) PCT Filed: Sep. 12, 2022

(86) PCT No.: PCT/FR2022/051712
§ 371 (c)(1),
(2) Date: Mar. 5, 2024

(87) PCT Pub. No.: WO2023/037085
PCT Pub. Date: Mar. 16, 2023

(65) Prior Publication Data
US 2025/0002167 A1    Jan. 2, 2025

(30) Foreign Application Priority Data
Sep. 13, 2021  (FR) .................................. 2109579

(51) Int. Cl.
  *B64D 29/06*    (2006.01)
  *B64D 29/08*    (2006.01)
(52) U.S. Cl.
  CPC ............. *B64D 29/06* (2013.01); *B64D 29/08* (2013.01)
(58) Field of Classification Search
  CPC ......... B64D 29/00; B64D 29/06; B64D 29/08
  See application file for complete search history.

(56) References Cited

U.S. PATENT DOCUMENTS 7,513,458 B2 * 4/2009 Layland ................. B64D 29/08
                                                244/134 R
2008/0315034 A1 * 12/2008 Vauchel ................. B64D 29/08
                                                244/54

(Continued)

FOREIGN PATENT DOCUMENTS

| EP | 2 750 972 A1 | 7/2014 |
| FR | 3 004 700 A1 | 10/2014 |
| FR | 3 031 341 A1 | 7/2016 |

OTHER PUBLICATIONS

International Search Report issued Dec. 19, 2022 in PCT/FR2022/051712, filed on Sep. 12, 2022, 2 pages.

*Primary Examiner* — Courtney D Heinle
*Assistant Examiner* — Danielle M. Christensen
(74) *Attorney, Agent, or Firm* — Oblon, McClelland, Maier & Neustadt, L.L.P.

(57) ABSTRACT

A nacelle for an aircraft propulsion unit includes an air intake cowl, and an intermediate section including fixed and removable hoods defining an access space between front ends of the hoods and an outer rear end of the air intake cowl. The intermediate section includes an annular row of mutually spaced connecting parts which rigidly connect the outer rear end of the air intake cowl to the front ends of the hoods so as to transmit longitudinal forces, and an intermediate cowl extending between the air intake cowl and the hoods, around the connecting parts, thereby closing the access space and creating aerodynamic continuity with the air intake cowl and the hoods. The intermediate cowl is formed from at least one strip which is held in place by tangential clamping of the circumferential ends of the strip.

10 Claims, 7 Drawing Sheets

(56) References Cited

U.S. PATENT DOCUMENTS

2017/0369189 A1 12/2017 Bulumulla et al.
2019/0300191 A1 10/2019 Porte et al.
2020/0290747 A1* 9/2020 Delsol ..................... B64C 3/28

* cited by examiner

COMPRISING AN ACCESS SPACE CLOSED BY A TANGENTIALLY CLAMPED COWL

TECHNICAL FIELD

The present invention pertains to the field of aircraft propulsion units, and more particularly relates to a nacelle of the type of which the intermediate section includes removable fixed hoods, that is to say hoods rigidly attached to at least one other part of the nacelle by means of attachment members that it is necessary to remove in order to provide access to the inside of the propulsion unit.

Prior Art

An aircraft propulsion unit nacelle generally has a tubular structure comprising, from upstream to downstream, an upstream section formed from an air intake cowl configured to separate, during operation, the air flow entering the turbine engine and the air flow bypassing the propulsion unit, an intermediate section configured to surround a fan of the turbine engine, and a downstream section including thrust reversal means and configured to surround the gas generator of the turbine engine. Cowl should be understood to be a single hood or an assembly of a plurality of hoods.

In some nacelles, the hoods of the intermediate section, commonly known as fan hoods, are mounted articulated on a fixed structure of the nacelle or of the mast of the propulsion unit and are thus able to pivot from a closed position to an open position, according to a movement referred to as "butterfly", to make it possible to access inside the propulsion unit, for example for maintenance operations. In general, these nacelles have a significant mass, a high cost, and their opening involves high loads.

In other nacelles, particularly when it is desired to avoid the aforementioned drawbacks, the hoods of the intermediate section are rigidly attached to at least one other part of the nacelle, particularly the air intake cowl, by means of attachment members that it is necessary to remove in order to access inside the propulsion unit. In this case, the hoods may be qualified as "fixed" and "removable". The present invention relates to nacelles including such hoods.

The document FR3004700 discloses an example of a nacelle with elongated air intake lip and removable fixed hoods.

In such a nacelle, the air intake cowl has an inner rear end configured to be rigidly removably attached to an annular flange of a fan casing of the turbine engine, and the air intake cowl has an outer rear end whereon the front ends of the removable fixed hoods are attached, by means of attachment through-members such as screws, quarter turn screws, or screws with reduced number of threads, distributed about the axis of the nacelle, and which are in general of number to ensure accurate docking between the various parts and to minimise unevenness.

When it is necessary to remove the air intake cowl, the fact of having to access the annular flange of the fan casing requires removing all of the attachment through-members of the hoods in order to remove the latter. Such an operation is thus long and costly to implement.

DISCLOSURE OF THE INVENTION

In particular, the aim of the invention is to provide a simple, economic and effective solution to the problem above.

For this purpose, it proposes a nacelle for an aircraft propulsion unit, comprising, from front to rear:
an air intake cowl having an inner rear end configured to be rigidly removably attached to a fan casing of a turbine engine, and an outer rear end;
an intermediate section including hoods of the fixed and removable type, distributed about an axis of the nacelle; and
a rear section.

According to the invention, the hoods have front ends each arranged axially facing and at a distance from the outer rear end of the air intake cowl so as to define an access space between the front ends of the hoods and the outer rear end of the air intake cowl, and the intermediate section further includes:
an annular row of mutually spaced connecting parts which rigidly connect the outer rear end of the air intake cowl to the front ends of the hoods so as to transmit longitudinal forces between the air intake cowl and the hoods; and
an intermediate cowl extending between the air intake cowl and the hoods, around the annular row of connecting parts, so as to close the access space and create aerodynamic continuity with the air intake cowl and the hoods, said intermediate cowl being formed from at least one strip which is held in place by tangential clamping of circumferential ends of the at least one strip.

When it is necessary to access an inner volume of the air intake cowl, tangential clamping of the ends of the strip(s) forming the intermediate cowl simply needs to be released, which is considerably quicker and easier than removing multiple annular rows of attachment members of the hoods, as was necessary with the nacelles of known type.

As soon as the intermediate cowl is removed, the access space is uncovered and makes it possible for an operator to access the inner volume of the air intake cowl, for example to work on the attachment means that connect the inner rear end of the air intake cowl to the fan casing.

The air intake cowl can thus be removed, or conversely, mounted on the turbine engine, and, more generally, the access to the inner volume is made possible, without having first to remove the hoods of the intermediate section.

The invention takes advantage of the fact that attaching the strip(s) forming the cowl is not critical for the safety of an aircraft in flight, due to the limited extension of the cowl, and therefore also to the limited mass of the latter, so that detaching such a strip during flight does not risk causing critical damage in the event of impact with the cell of the aircraft.

For this purpose, the cowl preferably has an axial extension less than 30 centimetres, and more preferably between 15 centimetres and 25 centimetres, and for example 20 centimetres.

In preferred embodiments of the invention, the air intake cowl includes a first edge radially inwardly offset and whereon a front end of the intermediate cowl rests.

In preferred embodiments of the invention, the hoods each include a second edge radially inwardly offset and whereon a rear end of the intermediate cowl rests.

In preferred embodiments of the invention, the at least one strip comprises two strips arranged on either side of a median vertical plane of the nacelle.

In preferred embodiments of the invention, tangential clamping of the at least one strip is performed by means of at least one elastically biased removable attachment member.

In preferred embodiments of the invention, the air intake cowl includes a clamping structure whereon tangential clamping of the at least one strip is performed.

In preferred embodiments of the invention, the connecting parts are connected by means of removable attachment through-members, on the one hand, to the outer rear end of the air intake cowl, and, on the other hand, to the front ends of the hoods.

In preferred embodiments of the invention, the rear section includes a thrust reverser comprising a deflector grille movable between a forward direct thrust position and a retracted thrust reversal position, and wherein the hoods cover at least a front portion of the deflector grille in the forward direct thrust position.

The invention also relates to an aircraft propulsion unit, comprising:
- a turbine engine comprising a fan and a fan casing surrounding the fan; and
- a nacelle of the type described above, surrounding the turbine engine, and of which the inner rear end of the air intake cowl is rigidly removably attached to the fan casing of the turbine engine.

In preferred embodiments of the invention, the fan casing includes a clamping structure whereon tangential clamping of the at least one strip is performed.

BRIEF DESCRIPTION OF THE DRAWINGS

The invention will be better understood and other details, advantages and features will become apparent upon reading the following description given by way of a non-limiting example and with reference to the appended drawings wherein.

In all of these figures, identical references may designate identical or similar elements.

DETAILED DISCLOSURE OF PREFERRED EMBODIMENTS

Figure 1:
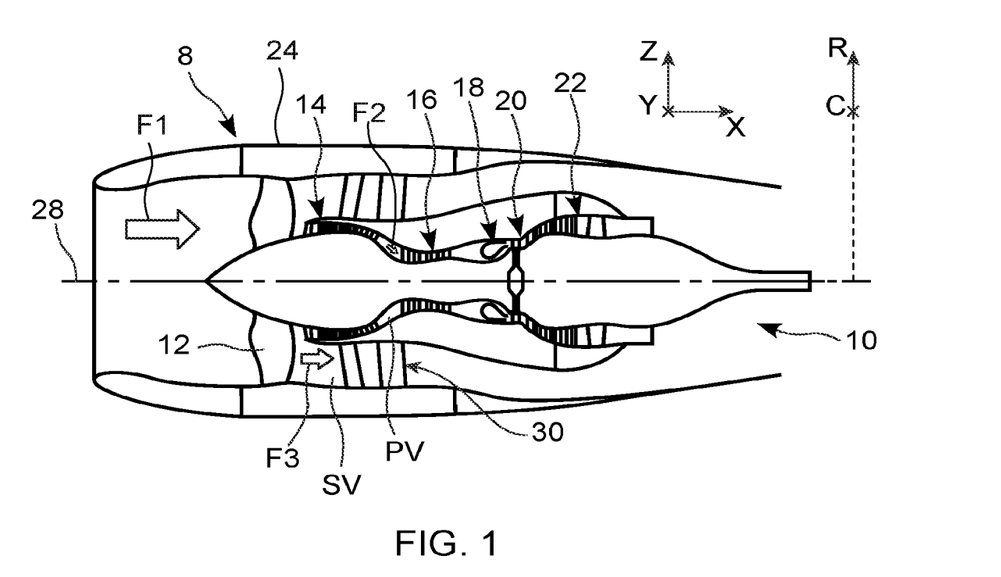
FIG. 1 is a partial schematic view in axial section of an aircraft propulsion unit.

FIG. 1 illustrates an aircraft propulsion unit 8, comprising a turbine engine 10 for example of the double flow and double body type, the latter generally including a fan 12 configured to suck in an air flow F1 splitting downstream of the fan into a primary flow F2 circulating in a primary flow channel, hereinafter known as primary duct PV, within the core of the turbine engine, and a secondary flow F3 bypassing this core in a secondary flow channel, hereinafter known as secondary duct SV.

The core of the turbine engine includes, generally, a low pressure compressor 14, a high pressure compressor 16, a combustion chamber 18, a high pressure turbine 20 and a low pressure turbine 22.

The respective rotors of the high pressure compressor and of the high pressure turbine are connected by a shaft referred to as "high pressure shaft", whereas the respective rotors of the low pressure compressor and of the low pressure turbine are connected by a shaft referred to as "low pressure shaft", in a well known manner.

The turbine engine is ducted by a nacelle 24 surrounding the secondary duct SV. Moreover, the rotors of the turbine engine are rotatably mounted about the axis of the turbine engine, which coincides with the axis of the nacelle 24 within the propulsion unit 8. These two axes are indifferently designated by the reference 28 throughout this description.

Throughout this description, the axial direction X is the direction of the axis 28, the vertical direction Z is a direction orthogonal to the axial direction X and oriented according to the vertical when the propulsion unit 8 equips an aircraft stationed on the ground, and the transverse direction Y is orthogonal to the two preceding directions. Moreover, the radial direction R and the circumferential direction C or azimuthal direction are defined with reference to the axis 28, whereas the "upstream" and "forward" direction on the one hand, and "downstream" and "rearward" directions on the other hand, are defined with reference to the general flow of the gases in the turbine engine.

Figure 2:
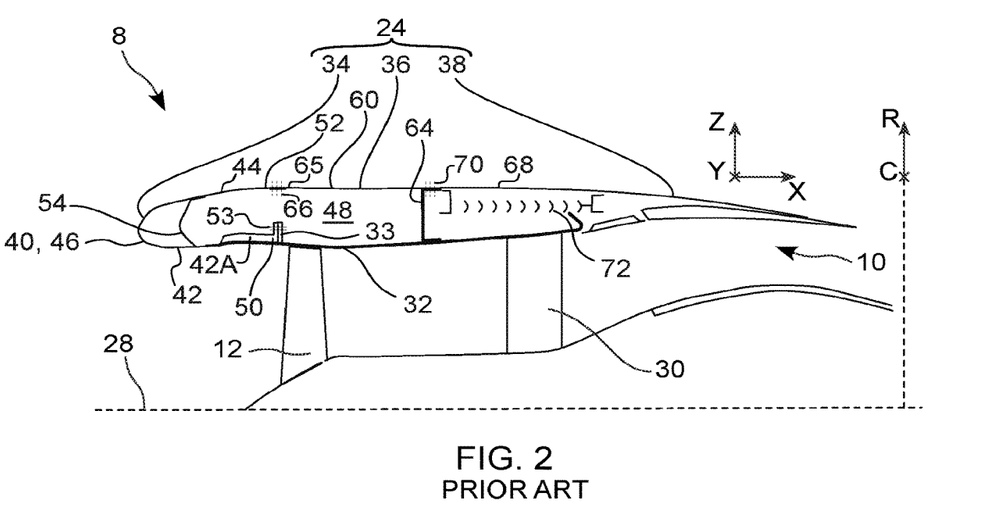
FIG. 2 is a partial schematic half-view in axial section on a larger scale of an aircraft propulsion unit of known type.

The turbine engine comprises an inter-compressor casing 30 arranged axially between the low pressure compressor 14 and the high pressure compressor 16, and shown alone in FIG. 2. In the non-limiting context of a double-body turbine engine, such an inter-compressor casing 30 is sometimes known as intermediate casing.

With reference to FIG. 2, which illustrates such a propulsion unit according to a known configuration, the inter-compressor casing 30 supports a fan casing 32 arranged upstream thereof, around the fan 12. The fan casing 32 includes an annular flange 33 at its upstream end.

Moreover, the nacelle 24 comprises, from front to rear, an air intake cowl 34, an intermediate section 36, and a rear section 38.

The air intake cowl 34 mainly includes an outer wall 40 having a globally C-shaped section, with upstreamly oriented convexity, configured to separate, during operation, the air flow entering the turbine engine 10 and the air flow bypassing the propulsion unit 8. The outer wall 40 thus has two opposite end portions respectively defining an inner shell 42 and an outer shell 44, mutually connected by an intermediate portion 46 of annular shape with convex section, forming an air inflow lip. The outer wall 40 thus delimits an inner volume 48 of the air intake cowl 34, which forms the front portion of an inner volume of the nacelle 24. The inner shell 42 has for example a rear end portion forming an acoustic panel 42A.

The inner shell 42 defines, at its rear end, an inner rear end 50 of the air intake cowl 34, whereas the outer shell 44 defines, at its rear end, an outer rear end 52 of the air intake cowl 34.

The inner rear end 50 is rigidly removably attached to the annular flange 33 of the fan casing 32, for example by means of one or more annular rows of removable attachment through-members 53 such as bolts.

By way of illustration, the air intake cowl 34 further includes an annular-shaped front partition 54 connecting a front region of the inner shell 42 to a front region of the outer shell 44.

In the example illustrated, the intermediate portion 46 or air inflow lip and the outer shell 44 are made in one piece. In other words, the air inflow lip is of the elongated type, that is to say extending up to the outer rear end 52 of the air intake cowl 34.

Alternatively, the intermediate portion 46 or air inflow lip and the outer shell 44 may be formed of distinct hoods assembled with one another. In this case, the air intake cowl 34 further includes an annular-shaped rear partition connecting a rear region of the inner shell 42 to a rear region of the outer shell 44.

The intermediate section 36 of the nacelle includes hoods 60 of the fixed and removable type, distributed about the axis 28 of the nacelle, and externally delimiting an intermediate portion 62 of the inner volume of the nacelle 24, around the fan casing 32, downstream of the inner volume 48 of the air intake cowl 34.

The intermediate section 36 further includes an annular-shaped main partition 64, extending within the intermediate portion 62 of the inner volume of the nacelle 24, and connecting the fan casing 32 to the hoods 60.

The hoods 60 have their respective front ends 65 rigidly connected to the outer rear end 52 of the air intake cowl 34. With the purpose of aerodynamic continuity, the front ends 65 of the hoods and the outer rear end 52 of the air intake cowl 34 are for example attached to a shell added on the inner surface of these elements, typically by means of annular rows of removable attachment through-members 66 such as screws. The hoods 60 have respective rear portions 68 attached on the main partition 64, typically by means of annular rows of removable attachment through-members 70 such as screws.

The rear section 38 of the nacelle includes for example a thrust reverser of the type comprising a deflector grille movable from front to rear to pass from a retracted configuration for operating the propulsion unit in direct thrust mode, to a deployed configuration for operating the propulsion unit in thrust reversal mode. The grille 72 of such a thrust reverser is for example surrounded, totally or partially, by the rear portions 68 of the hoods 60 in the retracted configuration, as can be seen in FIG. 2.

Figure 3:
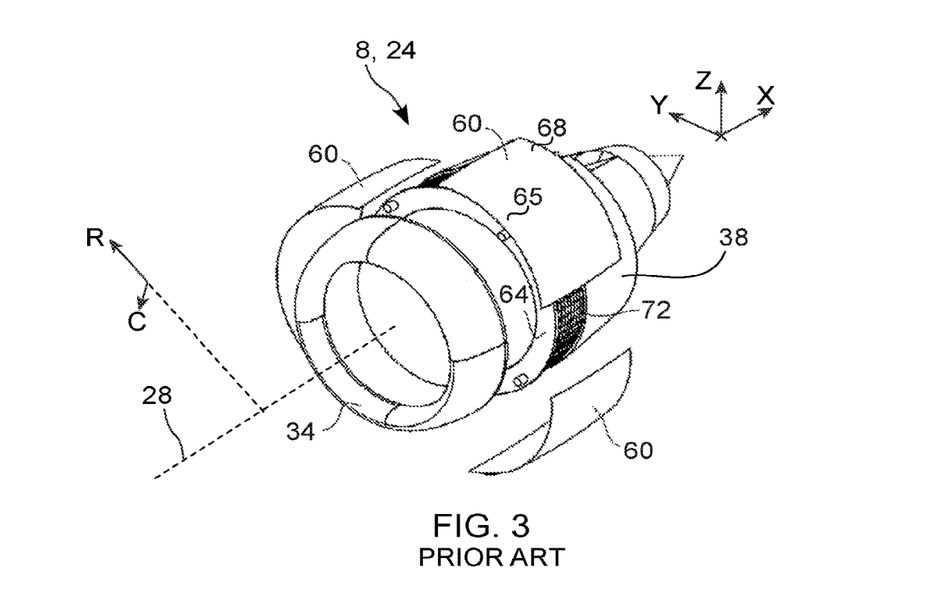
FIG. 3 is a schematic perspective view of the propulsion unit of FIG. 2 wherein hoods of the fixed and removable type have been detached.
Figure 4:
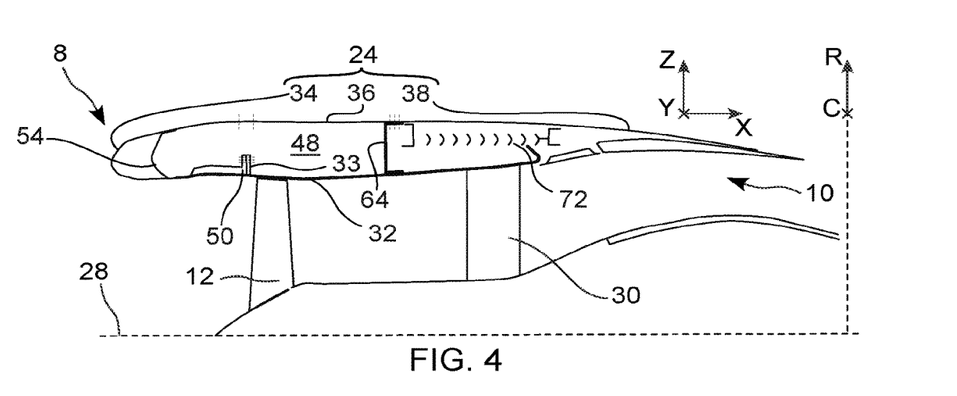
FIG. 4 is a view similar to FIG. 2, illustrating a propulsion unit according to a preferred embodiment of the invention.
Figure 5:
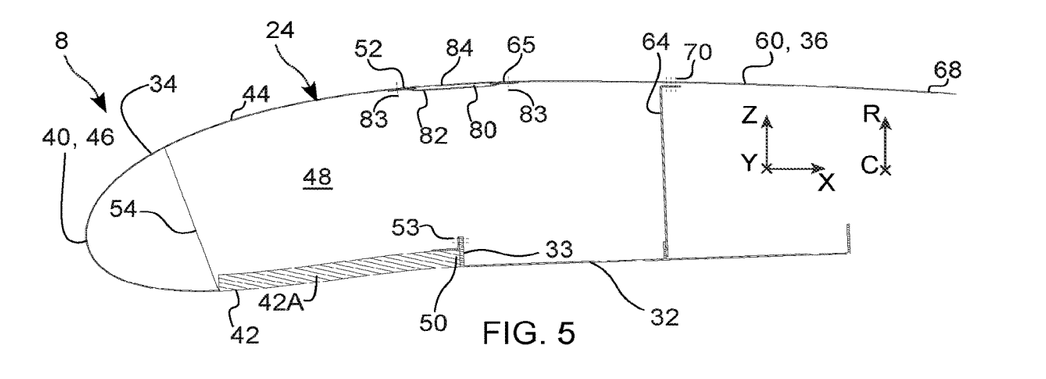
FIG. 5 is a larger scale view of a portion of FIG. 4, illustrating an air intake cowl and an intermediate section of a nacelle, and a fan casing, of the propulsion unit.

When it is necessary to remove the air intake cowl 34, the fact of having to access the annular flange 33 of the fan casing 32 requires removing all of the attachment members 66 and 70 of the hoods 60 to remove the latter and thus make it possible to access the inner volume of the nacelle, as illustrated in FIG. 3. Such an operation is long and costly to implement.

To remedy this problem, the nacelle 24 that equips the propulsion unit illustrated in FIGS. 4 to 14 is such that the hoods 60 have front ends 65 each arranged axially facing and at a distance from the outer rear end 52 of the air intake cowl 34 so as to define an access space 80 between the front ends 65 of the hoods and the outer rear end 52 of the air intake cowl (FIGS. 6 to 12). "Access space" should be understood to be a space having a sufficient axial extension to enable an operator to pass their arms through so that the latter can work on the removable attachment through-members 53 that connect the inner rear end 50 of the air intake cowl 34 to the annular flange 33 of the fan casing 32. It is considered that an axial extension of 20 centimetres is satisfactory for this purpose, although an axial extension more generally between 15 centimetres and 30 centimetres is possible in certain preferred embodiments of the invention.

In addition, the intermediate section 36 of the nacelle includes an annular row of mutually spaced connecting parts 82 (FIG. 6 and FIGS. 9-12) which rigidly connect the outer rear end 52 of the air intake cowl 34 to the front ends 65 of the hoods 60 so as to transmit longitudinal forces between the air intake cowl 34 and the hoods 60. In certain embodiments, the connecting parts 82 further contribute to transmitting radial loads and/or moments between the air intake cowl 34 and the hoods 60.

Figure 6:
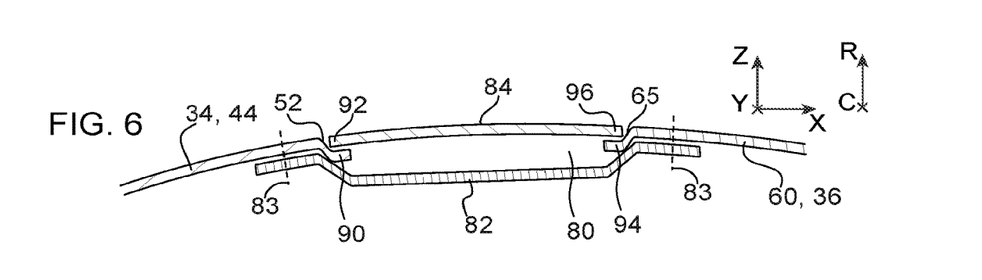
FIG. 6 is a larger scale view of a portion of FIG. 5, illustrating the air intake cowl and the intermediate section of the nacelle in section in the VI-VI plane of FIG. 9.

The connecting parts 82 are advantageously attached by means of removable attachment through-members 83, on the one hand, to the outer rear end 52 of the air intake cowl 34, and, on the other hand, to the front ends 65 of the hoods 60 (FIG. 6). The connecting parts 82 each have for this purpose opposite ends that are respectively added on the inner surface of the outer rear end 52 of the air intake cowl 34 and on the inner surface front ends 65 of the hoods 60.

Furthermore, the intermediate section 36 of the nacelle includes an intermediate cowl 84 (FIGS. 6 and 7) extending between the air intake cowl 34 and the hoods 60, around the annular row of connecting parts 82, so as to close the access space 80 and create aerodynamic continuity with the air intake cowl 34 and the hoods 60.

The intermediate cowl 84 is formed from a strip or a plurality of strips, for example two strips 86 (FIG. 8) arranged on either side of a median vertical plane P of the nacelle 24.

The strip or each strip 86 is held in place by tangential clamping of the circumferential ends 86A, 86B of the strip (FIG. 12), or of each strip, as will become more clearly apparent hereinafter.

Figure 7:
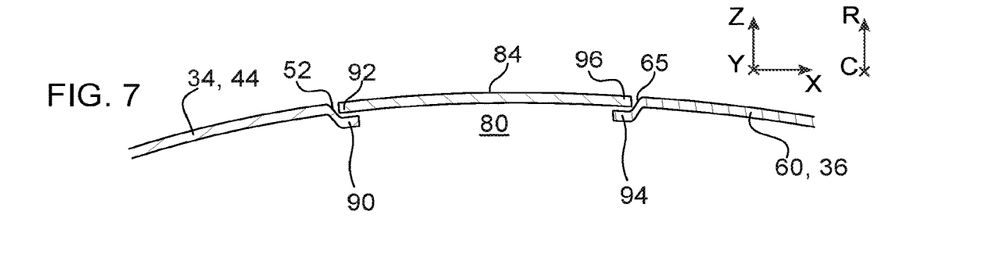
FIG. 7 is a view similar to FIG. 6, in section in the VII-VII plane of FIG. 9.
Figure 8:
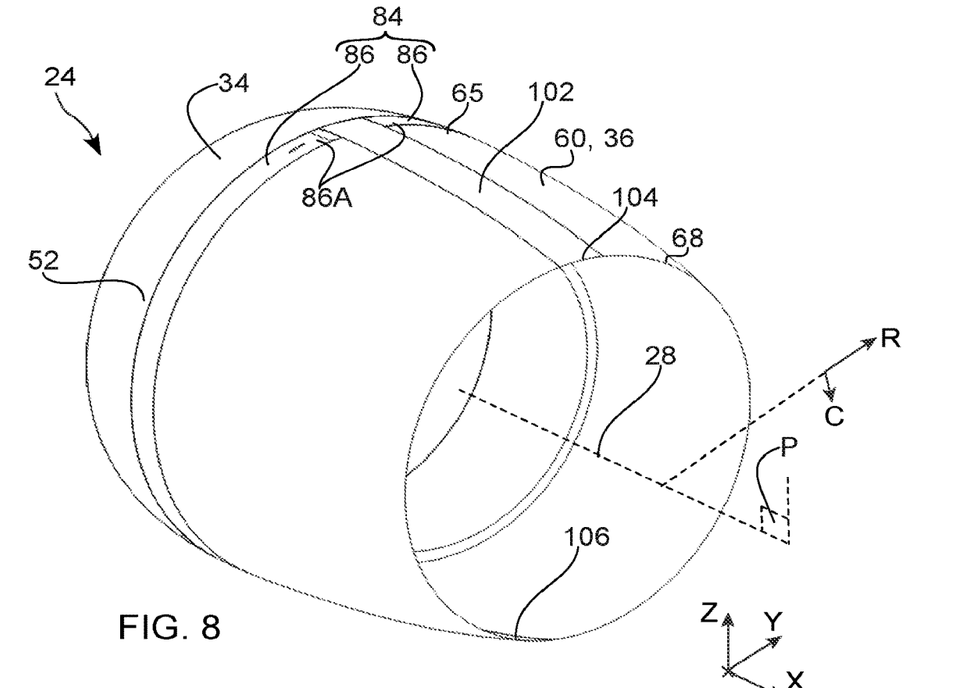
FIG. 8 is a partial schematic view of the propulsion unit of FIG. 4.
Figure 9:
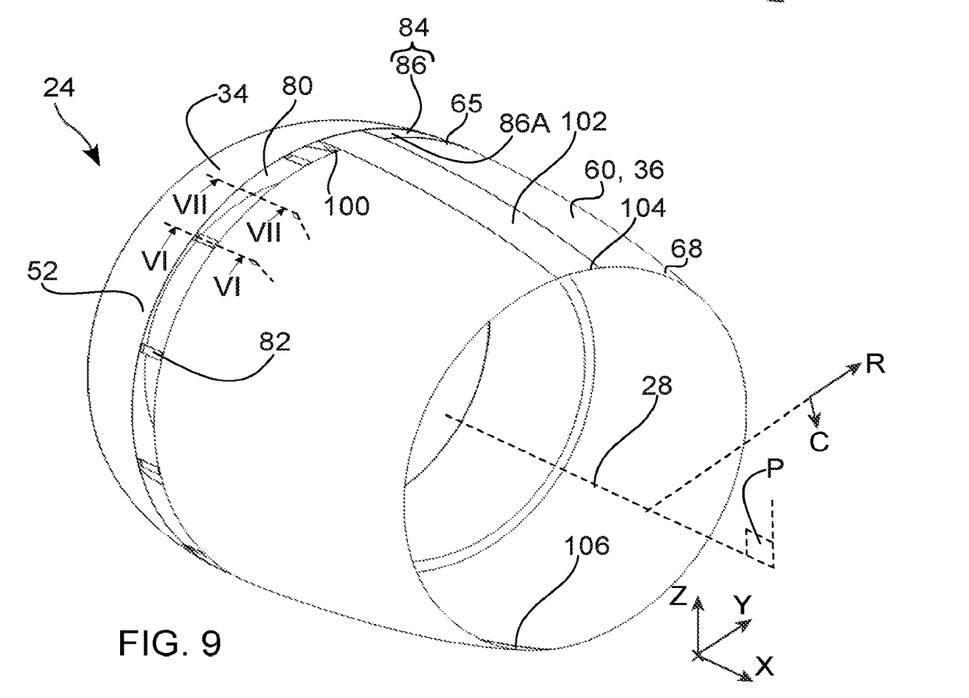
FIG. 9 is a view similar to FIG. 8, whereon a strip partially forming an intermediate cowl of the intermediate section of the nacelle has been shown, showing an access space between front ends of the hoods and an outer rear end of the air intake cowl.
Figure 10:
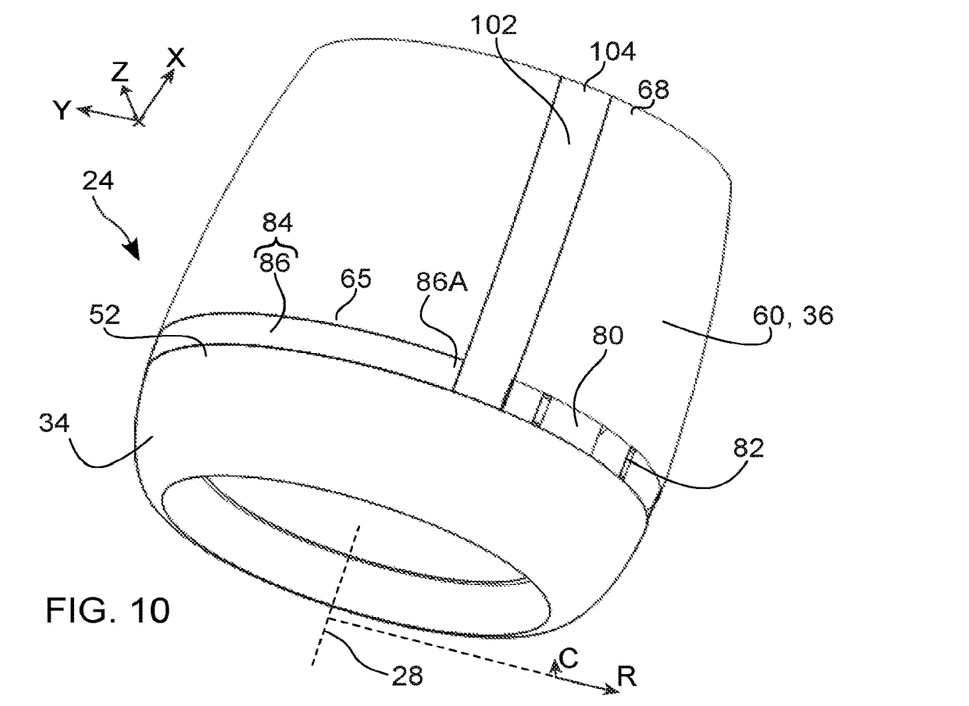
FIG. 10 is a view similar to FIG. 9, according to another view angle.
Figure 11:
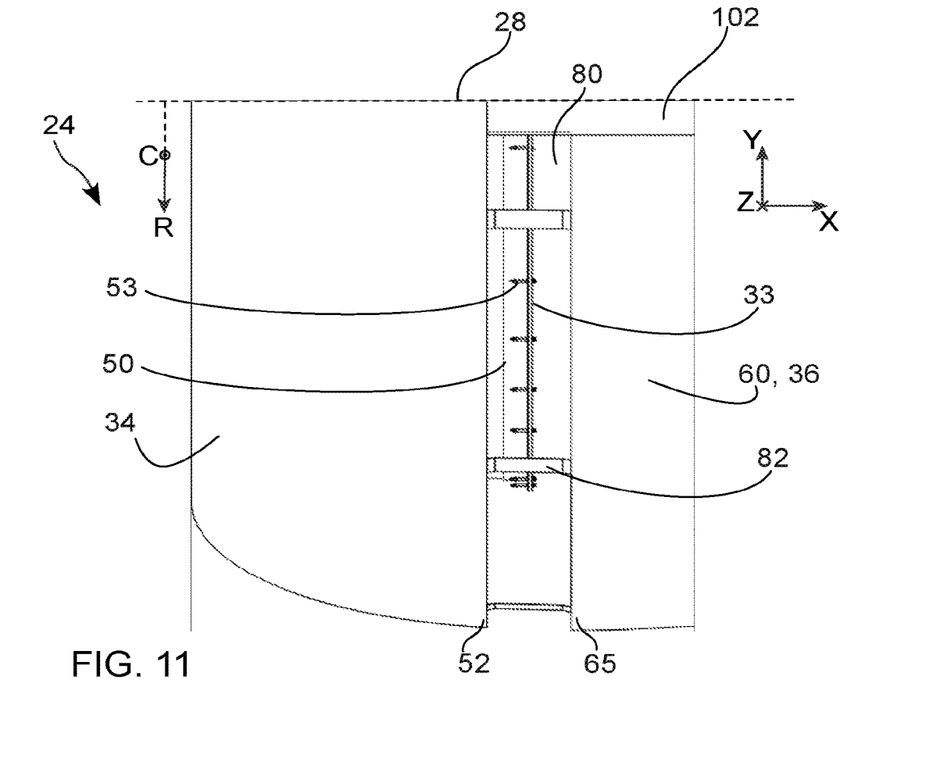
FIG. 11 is a partial schematic top view of the propulsion unit of FIG. 4, wherein said access space can be seen.

With reference to FIGS. 6 and 7, the air intake cowl 34 includes a first edge 90 radially inwardly offset and whereon a front end 92 of the intermediate cowl 84 rests. The first edge 90 is defined beyond the outer rear end 52 of the air intake cowl 34 in the rearward direction.

Similarly, the hoods 60 include respective second edges 94 radially inwardly offset whereon a rear end 96 of the intermediate cowl 84 rests. The second edges 94 are defined beyond the front ends 65 of the hoods 60 in the forward direction.

Thus, aerodynamic continuity can be ensured optimally between the air intake cowl 34 and the intermediate cowl 84 on the one hand, and between the intermediate cowl 84 and the hoods 60 on the other hand.

Tangential clamping of the strips 86 is carried out on clamping structures 100 (FIGS. 12 and 13) that are for example supported by the air intake cowl 34.

Figure 12:
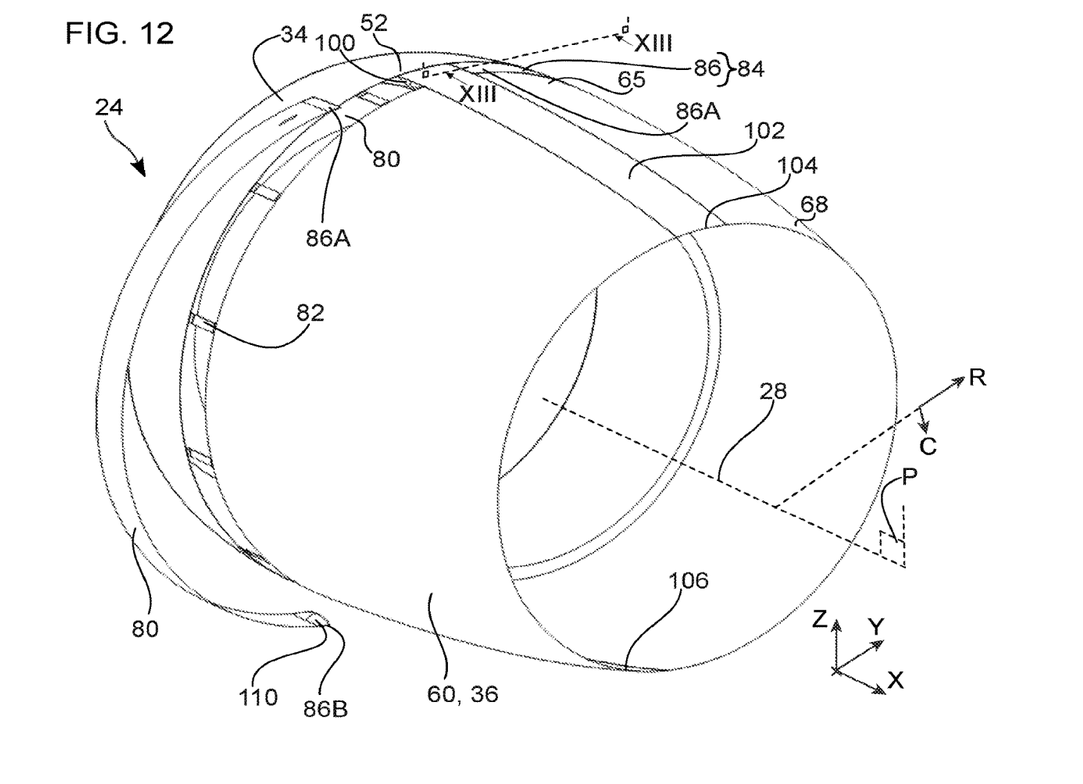
FIG. 12 is a view similar to FIG. 9, further showing said strip.
Figure 13:
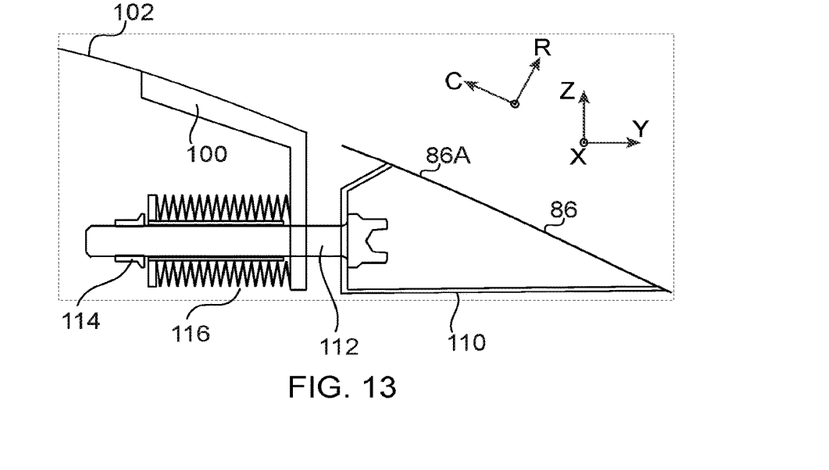
FIG. 13 is a partial schematic view of the propulsion unit of FIG. 4 in cross section along the XIII-XIII plane of FIG. 12, illustrating tangential clamping means of said intermediate cowl.

In the example illustrated, there are two such clamping structures 100 (of which one can be seen in the figures) arranged in the upper part of the nacelle 24, symmetrically on either side of the median vertical plane P, and two other similar clamping structures arranged in a lower part of the nacelle 24, also symmetrically on either side of the median vertical plane P.

The two clamping structures 100 arranged in the upper part of the nacelle 24 are for example covered by an upper longitudinal shroud strip 102, extending from the outer rear end 52 of the annular cowl and having a rear end level with the respective rear ends 104 of the hoods 60. Similarly, the two clamping structures arranged in the lower part of the nacelle 24 are for example covered by a lower longitudinal shroud strip 106, extending rearward from the outer rear end 52 of the annular cowl and having a rear end level with the respective rear ends 104 of the hoods 60. The longitudinal shroud strips are for example attached on the clamping structures 100.

Each strip 86 of the intermediate cowl 84 includes, at each of its circumferential ends 86A, 86B, a cage 110 added on the inner surface of the strip 86 and wherein at least one removable attachment member 112 such as a bolt is confined.

Tangential clamping of each strip 86 is carried out by inserting each of the removable attachment members 112 connected to the circumferential ends of the strip into orifices provided for this purpose in the corresponding clamping structures 100 in top and bottom position, then by screwing a nut 114 (or any other similar means) into each of the removable attachment members 112, with interposition of an elastic biasing means 116, such as a spring or Belleville washers, between the nut 114 and the corresponding clamping structure 100, so that the elastic biasing means 116 elastically bias the corresponding end of the strip in the direction of the clamping structure 100 considered.

Figure 14:
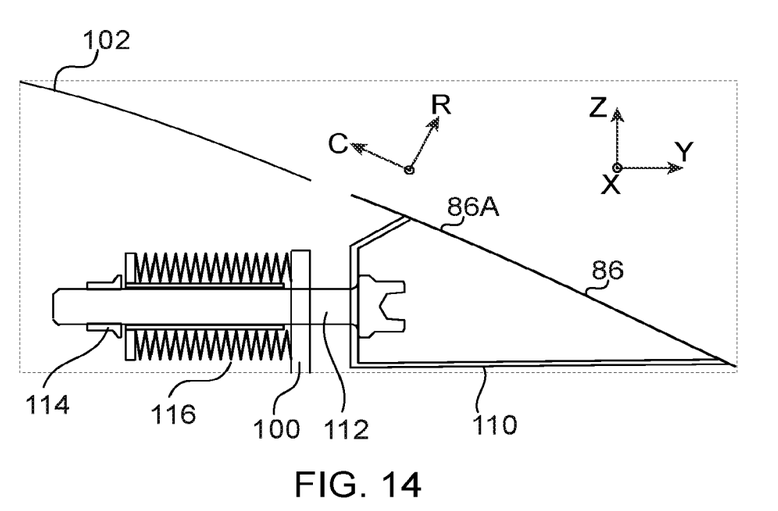
FIG. 14 is a view similar to FIG. 13, illustrating an alternative embodiment of said tangential clamping means.

FIG. 14 illustrates an alternative embodiment wherein the clamping structures 100 are supported by the fan casing 32.

Alternatively, the number of strips forming the intermediate cowl 84 and the number of clamping structures may be different from that described above.

For example, the two clamping structures 100 in top position may be grouped to form a single unitary structure. The same applies regarding the two clamping structures 100 in bottom position.

Moreover, the intermediate cowl 84 may be formed of a single strip extending about the entire axis 28 except for the region corresponding if applicable to the upper longitudinal shroud strip 102.

In such a case, tangential clamping of the strip forming the intermediate cowl 84 can be carried out directly between the two opposite ends of the strip, without involving any fixed clamping structure.

Still as an alternative, a combination of one or more clamping structure(s) supported by the air intake cowl 34 and of one or more other clamping structure(s) supported by the fan casing 32 may be provided.

In any case, when it is necessary to access the annular flange 33 of the fan casing 32, tangential clamping of the ends of the strip(s) 86 forming the intermediate cowl 84 simply needs to be released and the strip(s) 86 simply need(s) to be removed, which is considerably quicker and easier than removing multiple annular rows of attachment members of the hoods 60, as was necessary with the nacelles of known type.

In the example illustrated, this only requires removing a few removable attachment members 112 that ensure tangential clamping of the ends of the strips 86.

As soon as the intermediate cowl 84 is removed, the access space 80 becomes visible and makes it possible for an operator to access the inner volume of the nacelle and in particular the annular flange 33 of the fan housing 32, for example to work on the removable attachment through-members 53 that connect the inner rear end 50 of the air intake cowl 34 to the annular flange 33 of the fan casing 32.

When it is necessary to remove the air intake cowl 34, the procedure further requires removing the connecting parts 82, or at least dissociating them from the outer rear end 52 of the air intake cowl 34. The number of these connecting parts, which only depends on the level of the connecting forces to be transmitted through these parts, may be relatively moderate, so that the dissociation or the removal of these parts involves a number of operations for removing attachment members that is considerably lower than that required for removing the hoods of the intermediate section, needed with the nacelles of known type.

The air intake cowl 34 can thus be removed, or conversely, mounted, on the other corresponding parts of the nacelle, without having to first remove the hoods 60.

The invention takes advantage of the fact that attaching the strip(s) 86 forming the cowl 84 is not critical for the safety of an aircraft in flight, due to the limited extension of the intermediate cowl 84, and therefore also to the limited mass of the latter, which makes tangential clamping such as proposed in the invention acceptable. For this purpose, the intermediate cowl 84 preferably has an axial extension less than 30 centimetres.

The invention claimed is:

1. A nacelle for an aircraft propulsion unit, comprising, from front to rear:
   an air intake cowl having an inner rear end configured to be rigidly removably attached to a fan casing of a turbine engine, and an outer rear end;
   an intermediate section including hoods of the fixed and removable type, distributed about an axis of the nacelle; and
   a rear section;
   wherein the hoods have front ends each arranged axially facing and at a distance from the outer rear end of the air intake cowl so as to define an access space between the front ends of the hoods and the outer rear end of the air intake cowl;
   and wherein the intermediate section further includes:
     an annular row of mutually spaced connecting parts which rigidly connect the outer rear end of the air intake cowl to the front ends of the hoods so as to transmit longitudinal forces between the air intake cowl and the hoods; and
     an intermediate cowl extending between the air intake cowl and the hoods, around the annular row of connecting parts, so as to close the access spaces and create aerodynamic continuity with the air intake cowl and the hoods, said intermediate cowl being formed from at least one strip which is held in place by tangential clamping of the circumferential ends of the at least one strip.

2. The nacelle according to claim 1, wherein the air intake cowl includes a first edge radially inwardly offset and whereon a front end of the intermediate cowl rests.

3. The nacelle according to claim 1, wherein, the hoods each include a second edge radially inwardly offset and whereon a rear end of the intermediate cowl rests.

4. The nacelle according to claim 1, wherein the at least one strip comprises two strips arranged on either side of a median vertical plane of the nacelle.

5. The nacelle according to claim 1, wherein tangential clamping of the at least one strip is performed with at least one elastically biased removable attachment member.

6. The nacelle according to claim 1, wherein the air intake cowl includes a clamping structure whereon tangential clamping of the at least one strip is performed.

7. The nacelle according to claim 1, wherein the connecting parts are connected with removable attachment through-members, on the one hand, to the outer rear end of the air intake cowl, and, on the other hand, to the front ends of the hoods.

8. The nacelle according to claim 1, wherein the rear section includes a thrust reverser comprising a deflector grille movable between a forward direct thrust position and a retracted thrust reversal position, and wherein the hoods cover at least one front portion of the deflector grille in the forward direct thrust position.

9. A propulsion unit for an aircraft, comprising:
- a turbine engine comprising a fan and a fan casing surrounding the fan; and
- a nacelle according to claim 1, surrounding the turbine engine, and of which the inner rear end of the air intake cowl is rigidly removably attached to the fan casing of the turbine engine.

10. The propulsion unit according to claim 9, wherein the fan casing includes a clamping structure whereon tangential clamping of the at least one strip is performed.

\* \* \* \* \*

UNITED STATES PATENT AND TRADEMARK OFFICE
CERTIFICATE OF CORRECTION

| | | |
|---|---|---|
| PATENT NO. | : 12,365,472 B2 | Page 1 of 1 |
| APPLICATION NO. | : 18/689195 | |
| DATED | : July 22, 2025 | |
| INVENTOR(S) | : Pierre Charles Caruel | |

It is certified that error appears in the above-identified patent and that said Letters Patent is hereby corrected as shown below:

On the Title Page

Column 1, in Item (54), Line 1, and in the Specification Column 1, Lines 1-2, before "COMPRISING" insert -- NACELLE FOR AN AIRCRAFT PROPULSION UNIT --, therefor.

Signed and Sealed this
Twenty-first Day of October, 2025

John A. Squires
*Director of the United States Patent and Trademark Office*